(12) United States Patent
Kim et al.

(10) Patent No.: US 11,136,917 B2
(45) Date of Patent: Oct. 5, 2021

(54) AIRFOIL FOR TURBINES, AND TURBINE AND GAS TURBINE INCLUDING THE SAME

(71) Applicant: DOOSAN HEAVY INDUSTRIES & CONSTRUCTION CO., LTD., Changwon-si (KR)

(72) Inventors: Ye Jee Kim, Seoul (KR); Vincent Galoul, Paris (FR)

(*) Notice: Subject to any disclaimer, the term of this patent is extended or adjusted under 35 U.S.C. 154(b) by 66 days.

(21) Appl. No.: 16/736,097

(22) Filed: Jan. 7, 2020

(65) Prior Publication Data

US 2020/0271056 A1  Aug. 27, 2020

(30) Foreign Application Priority Data

Feb. 22, 2019 (KR) .......................... 10-2019-0021360

(51) Int. Cl.
| | | |
|---|---|---|
| *F01D 15/12* | (2006.01) | |
| *F02C 7/12* | (2006.01) | |
| *F01D 25/12* | (2006.01) | |
| *F02C 3/04* | (2006.01) | |
| *F01D 5/18* | (2006.01) | |

(52) U.S. Cl.
CPC ................. *F02C 7/12* (2013.01); *F01D 5/18* (2013.01); *F01D 5/186* (2013.01); *F01D 5/187* (2013.01); *F01D 25/12* (2013.01); *F02C 3/04* (2013.01); *F05D 2220/32* (2013.01); *F05D 2240/24* (2013.01); *F05D 2240/35* (2013.01); *F05D 2260/20* (2013.01)

(58) Field of Classification Search
CPC . F01D 25/12; F01D 5/18; F01D 5/186; F02C 7/12; F02C 3/04; F05D 2220/32; F05D 2240/24; F05D 2240/35; F05D 2260/20
See application file for complete search history.

(56) References Cited

U.S. PATENT DOCUMENTS

| | | | | |
|---|---|---|---|---|
| 4,180,373 A | * | 12/1979 | Moore ..................... | F01D 5/187 415/115 |
| 4,474,532 A | * | 10/1984 | Pazder .................... | F01D 5/187 416/97 R |
| 5,077,969 A | * | 1/1992 | Liang ....................... | F23R 3/06 60/766 |

(Continued)

FOREIGN PATENT DOCUMENTS

| | | |
|---|---|---|
| JP | 10-252405 A | 9/1998 |
| JP | 2012-154232 A | 8/2012 |
| KR | 1020150082944 A | 7/2015 |

*Primary Examiner* — Justin D Seabe
*Assistant Examiner* — Theodore C Ribadeneyra
(74) *Attorney, Agent, or Firm* — Harvest IP Law, LLP

(57) ABSTRACT

An airfoil, a turbine and a gas turbine having enhanced cooling performance are provided. The airfoil including a leading edge and a trailing edge may include: a first cooling passage connected to the leading edge; a second cooling passage connected to the trailing edge; a third cooling passage formed between the first cooling passage and the second cooling passage; a shock tube installed in the first cooling passage and configured to form an auxiliary cooling passage between the shock tube and the leading edge, and to include a plurality of dispersion hole in the shock tube; and a flow guide member installed on the shock tube and configured to guide a flow of air that is drawn from the third cooling passage into the first cooling passage.

19 Claims, 9 Drawing Sheets

(56) References Cited

U.S. PATENT DOCUMENTS

| | | | | |
|---|---|---|---|---|
| 5,361,828 A | * | 11/1994 | Lee | F01D 5/187 165/109.1 |
| 5,395,212 A | * | 3/1995 | Anzai | F01D 5/187 415/115 |
| 5,403,159 A | * | 4/1995 | Green | F01D 5/187 416/97 R |
| 5,695,321 A | * | 12/1997 | Kercher | F01D 5/187 416/97 R |
| 5,813,835 A | * | 9/1998 | Corsmeier | F01D 5/186 415/115 |
| 5,902,093 A | * | 5/1999 | Liotta | F01D 5/187 416/97 R |
| 5,975,851 A | * | 11/1999 | Liang | F01D 5/186 416/97 R |
| 6,206,638 B1 | * | 3/2001 | Glynn | F01D 5/187 416/97 R |
| 6,234,753 B1 | * | 5/2001 | Lee | F01D 5/187 416/97 R |
| 6,257,831 B1 | * | 7/2001 | Papple | B22C 9/10 416/97 R |
| 6,331,098 B1 | * | 12/2001 | Lee | F01D 5/187 416/97 R |
| 6,554,571 B1 | * | 4/2003 | Lee | F01D 5/187 416/92 |
| 6,932,573 B2 | * | 8/2005 | Liang | F01D 5/187 415/115 |
| 6,939,102 B2 | * | 9/2005 | Liang | F01D 5/188 415/115 |
| 6,974,308 B2 | * | 12/2005 | Halfmann | F01D 5/187 416/97 R |
| 7,104,757 B2 | * | 9/2006 | Gross | F01D 5/188 416/97 R |
| 7,192,251 B1 | * | 3/2007 | Boury | F01D 5/187 416/97 R |
| 7,641,444 B1 | * | 1/2010 | Liang | F01D 5/20 416/1 |
| 7,819,629 B2 | * | 10/2010 | Liang | F01D 5/187 416/97 R |
| 8,070,443 B1 | * | 12/2011 | Liang | F01D 5/187 416/97 R |
| 8,083,485 B2 | * | 12/2011 | Chon | F01D 5/187 416/97 R |
| 8,202,054 B2 | * | 6/2012 | Liang | F01D 5/186 416/97 R |
| 8,292,581 B2 | * | 10/2012 | Poon | F01D 5/087 416/97 R |
| 8,419,366 B2 | * | 4/2013 | Townes | F01D 5/187 416/97 R |
| 8,920,123 B2 | * | 12/2014 | Lee | F01D 5/187 416/97 R |
| 8,944,763 B2 | * | 2/2015 | Lee | F01D 5/187 416/97 R |
| 9,091,495 B2 | * | 7/2015 | Lee | F01D 5/187 |
| 9,376,921 B2 | * | 6/2016 | Papple | F01D 5/081 |
| 9,546,554 B2 | * | 1/2017 | Crites | F01D 5/187 |
| 9,932,836 B2 | * | 4/2018 | Schnieder | F01D 5/187 |
| 9,963,975 B2 | * | 5/2018 | King | F01D 9/065 |
| 9,995,148 B2 | * | 6/2018 | Molter | F01D 5/188 |
| 10,301,964 B2 | * | 5/2019 | Spangler | F01D 25/14 |
| 10,406,596 B2 | * | 9/2019 | Gleiner | B22C 9/101 |
| 10,584,596 B2 | * | 3/2020 | Mongillo, Jr. | F23M 5/085 |
| 10,683,763 B2 | * | 6/2020 | Halfmann | F01D 5/188 |
| 10,815,791 B2 | * | 10/2020 | Meier | F01D 5/147 |
| 10,934,856 B2 | * | 3/2021 | Srinivasan | F02C 3/04 |
| 2002/0119045 A1 | * | 8/2002 | Starkweather | F01D 5/187 416/97 R |
| 2003/0026698 A1 | * | 2/2003 | Flodman | F01D 5/186 416/97 R |
| 2005/0249583 A1 | * | 11/2005 | Mongillo | F01D 5/187 415/115 |
| 2006/0051208 A1 | * | 3/2006 | Lee | F01D 5/187 416/97 R |
| 2007/0048133 A1 | * | 3/2007 | Palmer | F01D 5/20 416/97 R |
| 2008/0118366 A1 | * | 5/2008 | Correia | F01D 5/187 416/97 R |
| 2009/0317234 A1 | * | 12/2009 | Zausner | F01D 5/187 415/115 |
| 2010/0254824 A1 | * | 10/2010 | Naik | F01D 5/186 416/97 R |
| 2012/0102910 A1 | * | 5/2012 | Francisco | F01D 25/30 60/39.5 |
| 2015/0040582 A1 | * | 2/2015 | Dong | F01D 5/187 60/806 |
| 2015/0377029 A1 | * | 12/2015 | Blake | F01D 9/065 416/232 |
| 2017/0107827 A1 | | 4/2017 | Krumanaker et al. | |
| 2018/0156042 A1 | * | 6/2018 | Mongillo, Jr. | F01D 5/20 |

\* cited by examiner

AIRFOIL FOR TURBINES, AND TURBINE AND GAS TURBINE INCLUDING THE SAME

CROSS-REFERENCE TO RELATED APPLICATION

This application claims priority to Korean Patent Application No. 10-2019-0021360, filed on Feb. 22, 2019, the disclosure of which is incorporated herein by reference in its entirety.

BACKGROUND

Field

Apparatuses and methods consistent with exemplary embodiments relate to an airfoil for turbines, and a turbine and a gas turbine including the airfoil.

Description of the Related Art

A gas turbine is a power engine configured to mix fuel with air compressed by a compressor, combust the mixture of the fuel and the compressed air, and rotate a turbine using high-temperature gas generated by the combustion. Gas turbines are used to drive a generator, an aircraft, a vessel, a train, and so forth.

The gas turbine includes a compressor, a combustor, and a turbine. The compressor draws external air thereinto, compresses the air, and transmits it to the combustor. The combustor mixes fuel with compressed air supplied from the compressor, and combusts the mixture of the fuel and the compressed air to generate a high temperature and high-pressure combustion gas. Combustion gas generated by the combustion is discharged to the turbine. Turbine blades provided in the turbine are rotated by the combustion gas, whereby power is generated. Generated power may be used in various fields, e.g., for generating electricity, driving a mechanical device, etc.

Recently, to increase the efficiency of a turbine, the temperature (turbine inlet temperature: TIT) of gas that is drawn into the turbine is on a gradual upward trend. Hence, the importance of heat-resist treatment and cooling of turbine blades is being emphasized.

A method of cooling a turbine blade includes a film cooling scheme and an internal cooling scheme. The film cooling scheme is a scheme in which a coating film is formed on an outer surface of the turbine blade so that heat may be prevented from being transferred from the outside to the turbine blade. In the film cooling scheme, heat-resistant characteristics and mechanical durability of the blade depend on heat-resistant paint to be applied to the turbine blade.

The internal cooling scheme is a scheme of cooling the blade by heat exchange between cooling fluid and the blade. Generally, the turbine blade is cooled by compressed cooling air supplied from the compressor of the gas turbine. Because air compressed by the compressor is generated to be used in the combustor of the gas turbine, the entire efficiency of the gas turbine may be reduced if the amount of compressed air is increased to cool the turbine blade. Therefore, to efficiently cooling the turbine blade, the entirety of the blade is required to be uniformly cooled by a small amount of cooling fluid.

SUMMARY

Aspects of one or more exemplary embodiments provide an airfoil, a turbine, and a gas turbine having enhanced cooling performance.

Additional aspects will be set forth in part in the description which follows and, in part, will become apparent from the description, or may be learned by practice of the exemplary embodiments.

According to an aspect of an exemplary embodiment, there is provided an airfoil including a leading edge and a trailing edge including: a first cooling passage connected to the leading edge; a second cooling passage connected to the trailing edge; a third cooling passage formed between the first cooling passage and the second cooling passage; a shock tube installed in the first cooling passage and configured to form an auxiliary cooling passage between the shock tube and the leading edge, and to include a plurality of dispersion holes in the shock tube; and a flow guide member installed on the shock tube and configured to guide a flow of air that is drawn from the third cooling passage into the first cooling passage.

An upper portion of the third cooling passage and an upper portion of the first cooling passage may be connected to each other so that cooling air moves from the third cooling passage to the first cooling passage. The flow guide member may be installed on an upper portion of the shock tube, and a pressure drop space may be formed to a lower surface of the flow guide member.

The flow guide member may be curved in an arc shape.

The flow guide member may include a first plate fixed to the shock tube, and a second plate bent from the first plate.

The flow guide member may include a first plate fixed to the shock tube, a second plate bent at an angle from the first plate, and a third plate bent inward from the second plate.

The flow guide member may be formed such that a lower surface thereof is concave.

The flow guide member may include a flat plate inclined with respect to a height direction of the shock tube.

The flow guide member may include a plurality of pressure adjustment holes.

Each of the pressure adjustment holes may be formed such that an inner diameter thereof is gradually reduced toward the shock tube.

A plurality of flow guide members may be disposed on the shock tube and spaced apart from each other in a height direction of the shock tube.

Each of the flow guide members may be formed such that a lower surface thereof is convex.

The flow guide member that is disposed at an inner side may have a width less than a width of the flow guide member that is disposed at an outer side.

According to an aspect of another exemplary embodiment, there is provided a turbine including: a rotor disk configured to be rotatable; and a plurality of turbine blades installed on the rotor disk. Each of the turbine blades may include an airfoil having a blade shape and including a leading edge and a trailing edge, a platform coupled to a lower portion of the airfoil, and a root member protruding downward from the platform and coupled to the rotor disk. The airfoil may include: a first cooling passage connected to the leading edge; a second cooling passage connected to the trailing edge; a third cooling passage formed between the first cooling passage and the second cooling passage; a shock tube installed in the first cooling passage and configured to form an auxiliary cooling passage between the shock tube and the leading edge, and to include a plurality of dispersion holes in the shock tube; and a flow guide member installed on the shock tube and configured to guide a flow of air that is drawn from the third cooling passage into the first cooling passage.

An upper portion of the third cooling passage and an upper portion of the first cooling passage may be connected to each other so that cooling air moves from the third cooling passage to the first cooling passage. The flow guide member may be installed on an upper portion of the shock tube, and a pressure drop space may be formed to a lower surface of the flow guide member.

The flow guide member may include a plurality of pressure adjustment holes. Each of the pressure adjustment holes may be formed such that an inner diameter thereof is gradually reduced toward the shock tube.

The flow guide member may be curved in an arc shape.

The flow guide member may include a first plate fixed to the shock tube, and a second plate bent from the first plate.

The flow guide member may include a first plate fixed to the shock tube, a second plate bent at an angle from the first plate, and a third plate bent inward from the second plate.

The flow guide member may be formed such that a lower surface thereof is concave.

According an aspect of another exemplary embodiment, there is provided a gas turbine including: a compressor configured to compress air drawn thereinto from an outside, a combustor configured to mix fuel with the air compressed by the compressor and combust a mixture of the fuel and the compressed air, and a turbine including a plurality of turbine blades configured to be rotated by combustion gas discharged from the combustor. Each of the turbine blades may include an airfoil having a blade shape and including a leading edge and a trailing edge, a platform coupled to a lower portion of the airfoil, and a root member protruding downward from the platform and coupled to the rotor disk. The airfoil may include: a first cooling passage connected to the leading edge; a second cooling passage connected to the trailing edge; a third cooling passage formed between the first cooling passage and the second cooling passage; a shock tube installed in the first cooling passage and configured to form an auxiliary cooling passage between the shock tube and the leading edge, and to include a plurality of dispersion holes in the shock tube; and a flow guide member installed on the shock tube and configured to guide a flow of air that is drawn from the third cooling passage into the first cooling passage.

BRIEF DESCRIPTION OF THE DRAWINGS

The above and other aspects will be more clearly understood from the following description of the exemplary embodiments with reference to the accompanying drawings, in which.

DETAILED DESCRIPTION

Figure 1:
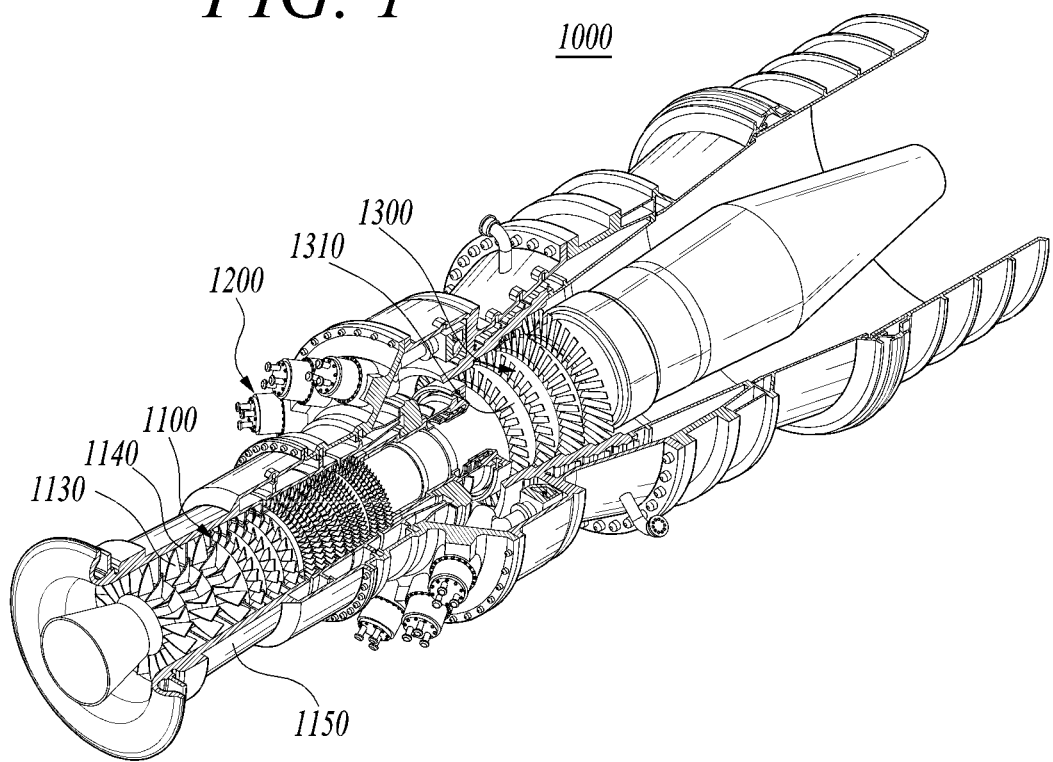
FIG. 1 is a diagram illustrating an internal structure of a gas turbine in accordance with an exemplary embodiment.

Various modifications and various embodiments will be described in detail with reference to the drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The terminology used herein is for the purpose of describing specific embodiments only and is not intended to limit the scope of the disclosure. The singular expressions "a", "an", and "the" are intended to include the plural expressions as well, unless the context clearly indicates otherwise. In the disclosure, the terms such as "comprise", "include", "have/has" should be construed as designating that there are such features, integers, steps, operations, elements, components, and/or combinations thereof, not to exclude the presence or possibility of adding of one or more of other features, integers, steps, operations, elements, components, and/or combinations thereof.

Hereinafter, exemplary embodiments will be described in detail with reference to the accompanying drawings. Reference now should be made to the drawings, in which the same reference numerals are used throughout the different drawings to designate the same or similar components. Details of well-known configurations and functions may be omitted to avoid unnecessarily obscuring the gist of the present disclosure. For the same reason, in the accompanying drawings, some elements are enlarged, omitted, or depicted schematically.

Figure 2:
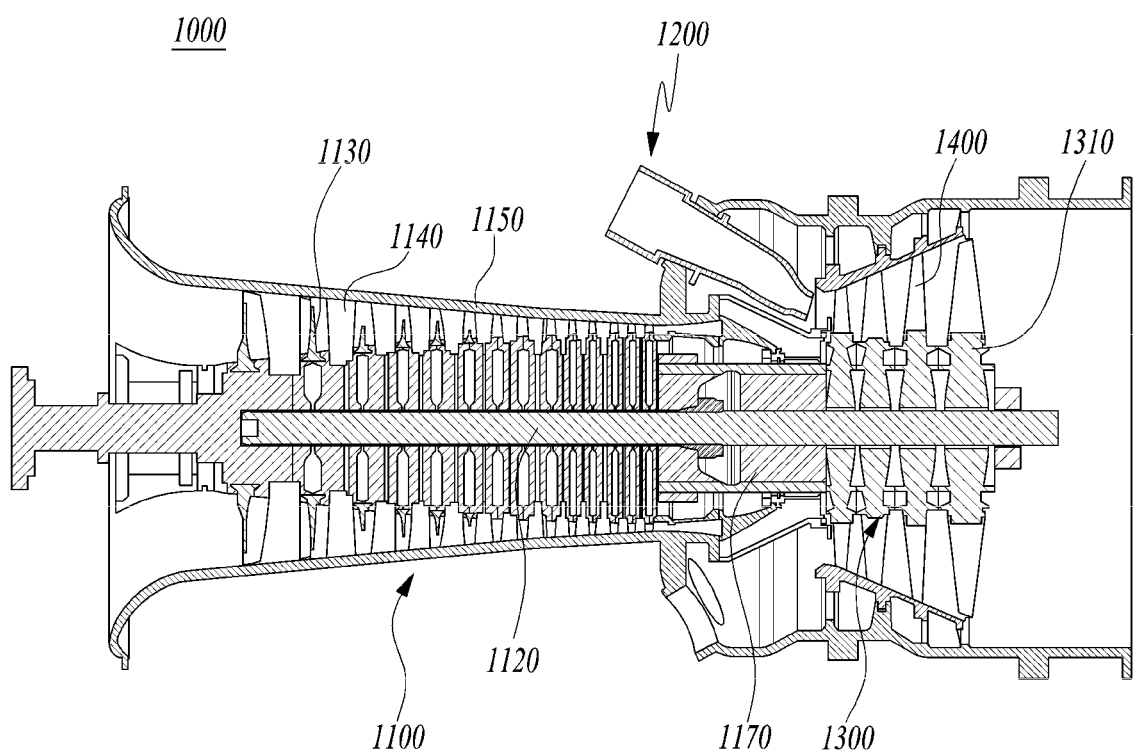
FIG. 2 is a longitudinal sectional view illustrating a portion of the gas turbine of FIG. 1.

FIG. 1 is a diagram illustrating an internal structure of a gas turbine in accordance with an exemplary embodiment, and FIG. 2 is a longitudinal sectional view of a portion of the gas turbine of FIG. 1.

For example, the thermodynamic cycle of the gas turbine 1000 in accordance with the exemplary embodiment may ideally comply with the Brayton cycle. The Brayton cycle may consist of four processes including an isentropic compression (i.e., adiabatic compression) process, an isobaric heat supply process, an isentropic expansion (i.e., adiabatic expansion) process, and an isobaric heat rejection process. In other words, the gas turbine may draw air from the atmosphere, compress the air to a high pressure, combust fuel under isobaric conditions to emit thermal energy, expand the high-temperature combustion gas to convert the thermal energy of the combustion gas into kinetic energy, and discharge exhaust gas with residual energy to the atmosphere. As such, the Brayton cycle may consist of four processes including compression, heat addition, expansion, and heat rejection.

Referring to FIGS. 1 and 2, the gas turbine 1000 embodying the Brayton cycle may include a compressor 1100, a combustor 1200, and a turbine 1300. The compressor 1100 may draw air from the outside and compress the air. The compressor 1100 may supply air compressed by compressor blades 1130 to the combustor 1200 and also supply compressed air for cooling to a high-temperature region needed to be cooled in the gas turbine 1000. Here, drawn air is compressed in the compressor 1100 through an adiabatic compression process, so that the pressure and the temperature of air passing through the compressor 1100 are increased.

The compressor 1100 is designed in the form of a centrifugal compressor or an axial compressor. The centrifugal compressor is used in a small gas turbine. On the one hand, in a large gas turbine such as the gas turbine 1000 illustrated in FIG. 1, a multi-stage axial compressor 1100 is used to compress a large amount of air. In the multi-stage axial compressor 1100, the compressor blades 1130 rotate along with rotation of a center tie rod 1120 and a rotor disk, compress drawn air, and transfer compressed air to compressor vanes 1140 disposed at a following stage. Air is compressed gradually to high pressures while passing through the compressor blades 1130 formed in a multi-stage structure.

The compressor vanes 1140 may be mounted to an inner surface of a housing 1150 in such a way that a plurality of compressor vanes 1140 form each stage. The compressor vanes 1140 guide compressed air transferred from the compressor blades 1130 disposed at a preceding stage, toward the compressor blades 1130 disposed at the following stage. In an exemplary embodiment, at least some of the plurality of compressor vanes 1140 may be mounted so as to be rotatable within a predetermined range, e.g., to adjust the flow rate of air.

The compressor 1100 may be operated using some of the power output from the turbine 1300. To this end, a rotating shaft of the compressor 1100 may be directly coupled with a rotating shaft of the turbine 1300 by a torque tube 1170. In the case of the large gas turbine 1000, almost half of the output produced by the turbine 1300 may be consumed to drive the compressor 1100.

The combustor 1200 may mix fuel with compressed air supplied from the compressor 1100 and combust the mixture through an isobaric combustion process to generate combustion gas having high energy. The combustor 1200 mixes introduced compressed air with fuel, combusts the fuel mixture to generate high-temperature and high-pressure combustion gas having high energy, and increases, through an isobaric combustion process, the temperature of the combustion gas to a heat resistant limit temperature at which the parts of the combustor and the turbine can endure.

A plurality of combustors constituting the combustor 1200 may be arranged in a housing in a form of a cell. Each of the combustors includes a burner including a fuel injection nozzle, etc., a combustor liner forming a combustion chamber, and a transition piece serving as a connector between the combustor and the turbine.

The high-temperature and high-pressure combustion gas ejected from the combustor 1200 is supplied to the turbine 1300. The supplied high-temperature and high-pressure combustion gas expands and applies impingement or reaction force to the turbine blades 1400 to generate rotational torque. A portion of the rotational torque is transmitted to the compressor 1100 via the torque tube 1170, and the remaining portion which is the excessive torque is used to drive the generator or the like.

The turbine 1300 includes a rotor disk 1310, a plurality of turbine blades 1400 which are radially disposed on the rotor disk 1310, and vanes. The rotor disk 1310 has an approximately disk shape, and a plurality of slots are formed in an outer circumferential surface of the rotor disk 1310. Each slot has a corrugated surface. The turbine blades 1400 are inserted into respective slots. Each of the turbine blades 1400 may be coupled to the rotor disk 1310 in a dovetail coupling manner. The vanes fixed to the housing are provided between the turbine blades 1400 to guide a flow direction of combustion gas passing through the turbine blades 1400.

Figure 3:
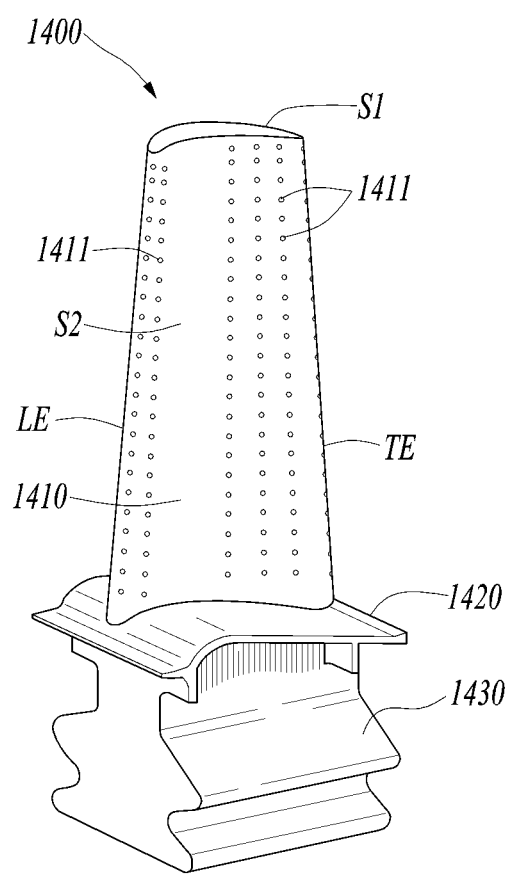
FIG. 3 is a perspective view illustrating a turbine blade in accordance with an exemplary embodiment.
Figure 4:
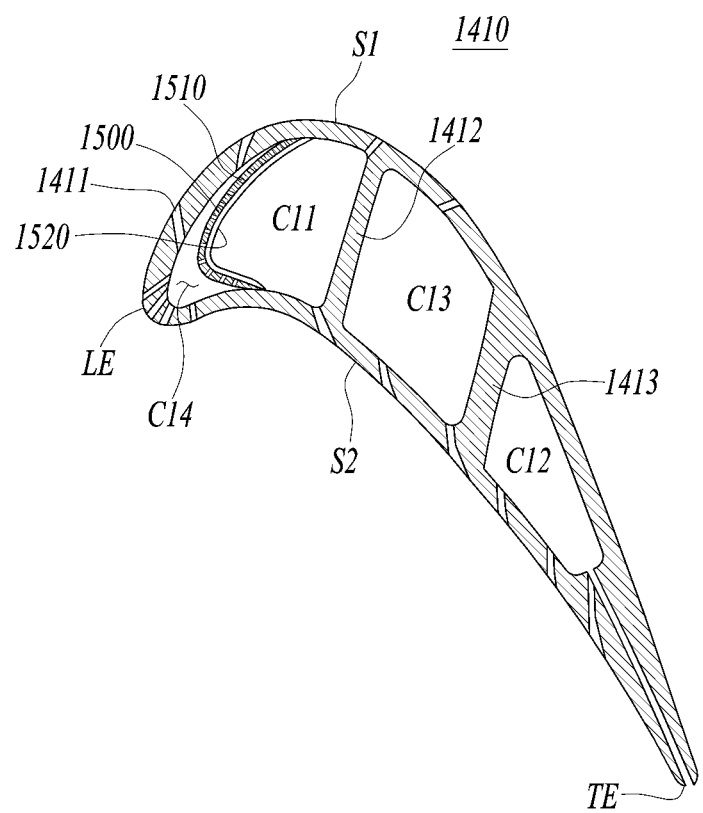
FIG. 4 is a cross-sectional view illustrating an airfoil in accordance with an exemplary embodiment.
Figure 5:
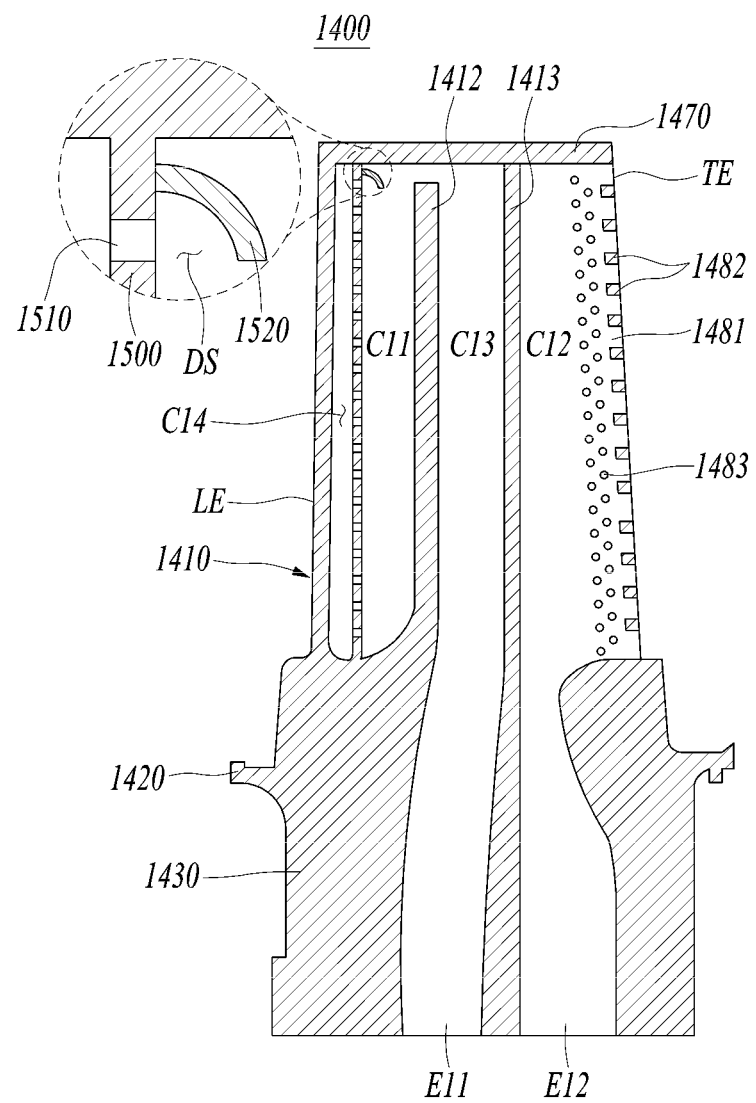
FIG. 5 is a longitudinal sectional view illustrating the turbine blade in accordance with an exemplary embodiment.

FIG. 3 is a perspective view illustrating a turbine blade in accordance with an exemplary embodiment, FIG. 4 is a cross-sectional view illustrating an airfoil in accordance with an exemplary embodiment, and FIG. 5 is a longitudinal sectional view illustrating the turbine blade in accordance with an exemplary embodiment.

Referring to FIG. 3, the turbine blade 1400 may include an airfoil 1410 having a blade shape, a platform 1420 coupled to a lower portion of the airfoil 1410, and a root member 1430 which protrudes downwards from the platform 1420 and is coupled to the rotor disk. The airfoil 1410 may be a curved plate having a blade shape, and have an optimized blade shape according to specifications of the gas turbine 1000.

The platform 1420 may be disposed between the airfoil 1410 and the root member 1430 and have an approximately rectangular plate or rectangular pillar shape. The platform 1420 has a side surface which comes into contact with a side surface of the platform 1420 of an adjacent turbine blade 1400 to maintain an interval between the adjacent turbine blades 1400.

The root member 1430 has a corrugated portion having an approximately fir-tree shape corresponding to the fir-tree-shaped corrugated portion formed in a slot of the rotor disk 1310. It is understood that the coupling structure of the root member 1430 is not limited thereto, and may be formed to have a dovetail structure. A first inlet E11 and a second inlet E12 for supply of cooling air may be formed in a lower end of the root member 1430.

The airfoil 1410 may include a leading edge LE disposed at an upstream side based on a flow direction of combustion gas, and a trailing edge TE disposed at a downstream side. Furthermore, a suction side S1 protruding outward to have an outward-convex curved surface is formed on a front surface of the airfoil 1410 onto which combustion gas is drawn, and a pressure side S2 having a curved surface depressed in a concave shape toward the suction side S1 is formed on a rear surface of the airfoil 1410. A difference in pressure occurs between the suction side S1 and the pressure side S2 of the airfoil 1410, whereby the turbine 1300 is rotated.

A plurality of cooling holes 1411 are formed in a surface of the airfoil 1410. The cooling holes 1411 communicate with a cooling passage formed in the airfoil 1410 so that cooling air may be supplied to the surface of the airfoil 1410.

Referring to FIGS. 4 and 5, the airfoil 1410 may include an outer wall 1470 which forms an outer appearance, and cooling passages C11, C12, C13, and C14, dividing plates 1412 and 1413, a shock tube 1500, and a flow guide member 1520 which are formed inside the outer wall 1470. The airfoil 1410 may include a first cooling passage C11 coupled with the leading edge LE, a second cooling passage C12 coupled with the trailing edge TE, a third cooling passage C13 formed between the first cooling passage C11 and the second cooling passage C12, and an auxiliary cooling passage C14 formed by a pressure tube in the first cooling passage C11. The airfoil 1410 may include a first dividing plate 1412 and a second dividing plate 1413 which extend in a height direction of the airfoil 1410 and divide an internal space of the airfoil 1410 into several portions.

The first cooling passage C11 is formed by the leading edge LE and the first dividing plate 1412 and connected with the second cooling passage C12. Air drawn into the first cooling passage C11 passes through the shock tube 1500 and is discharged through the cooling holes 1411 formed adjacent to the leading edge LE.

The second cooling passage C12 is formed by the trailing edge TE and the second dividing plate 1413. A plurality of cooling fins 1483 may be formed in the second cooling passage C12. The airfoil 1410 may further include a plurality of rear end cooling slots 1481 which are coupled with the second cooling passage C12 to discharge air from the second cooling passage C12 and spaced apart from each other in a height direction of the trailing edge TE, and a dividing protrusion 1482 which is formed between the rear end cooling slots 1481 to separate the rear end cooling slots 1481 from each other. The second cooling passage C12 is connected with the second inlet E12 and supplied with air. Air drawn into the second cooling passage C12 is discharged through the rear end cooling slots 1481.

The third cooling passage C13 is formed by the first dividing plate 1412 and the second dividing plate 1413. The third cooling passage C13 is connected with the first inlet E11 formed in a lower portion thereof so that air may be supplied to the third cooling passage C13. Some of air drawn into the third cooling passage C13 is discharged through the cooling holes 1411, and the other air is supplied into the first cooling passage C11.

The first dividing plate 1412 is disposed to face the leading edge LE. The second dividing plate 1413 is disposed to face the trailing edge TE. An upper end of the first dividing plate 1412 is spaced apart from an upper end tip of the airfoil 1410. Therefore, air may move through space formed between the upper end of the first dividing plate 1412 and the tip of the airfoil 1410, and an upper portion of the third cooling passage C13 may be connected with an upper portion of the first cooling passage C11. Air supplied through the first inlet E11 moves upward along the third cooling passage C13 and moves into the first cooling passage C11. In the third cooling passage C13, air moves from an inner side to an outer side. In the first cooling passage C11, air moves from the outer side to the inner side.

The shock tube 1500 may be disposed in the first cooling passage C11 to form the auxiliary cooling passage C14 between the shock tube 1500 and the leading edge LE. The shock tube 1500 having an arc-shaped curved cross-section is disposed at a position spaced apart from the leading edge LE by a predetermined distance. The shock tube 1500 extends in the height direction of the airfoil 1410. A plurality of dispersion holes 1510 are formed in the shock tube 1500. Air drawn from the third cooling passage C13 into the first cooling passage C11 passes through the shock tube 1500 and is discharged through the cooling holes 1411 formed in the leading edge LE. The shock tube 1500 functions to enhance the cooling efficiency by coming into contact with air.

A flow guide member 1520 may be installed on the shock tube 1500. The flow guide member 1520 is formed of an arc-shaped curved plate. The flow guide member 1520 is installed on an upper portion of the shock tube 1500, and may be installed on an upper end of the shock tube 1500 or installed at a position spaced apart from the upper end of the shock tube 1500 by a predetermined distance.

The flow guide member 1520 may be curved such that a lower surface thereof is concave. Therefore, a pressure drop space DS is formed under the flow guide member 1520. If the pressure drop space DS is formed under the flow guide member 1520, air is drawn into the pressure drop space DS, so that a large amount of air may be drawn into relatively small space into which air is drawn, whereby the leading edge LE may be uniformly cooled.

Figure 6:
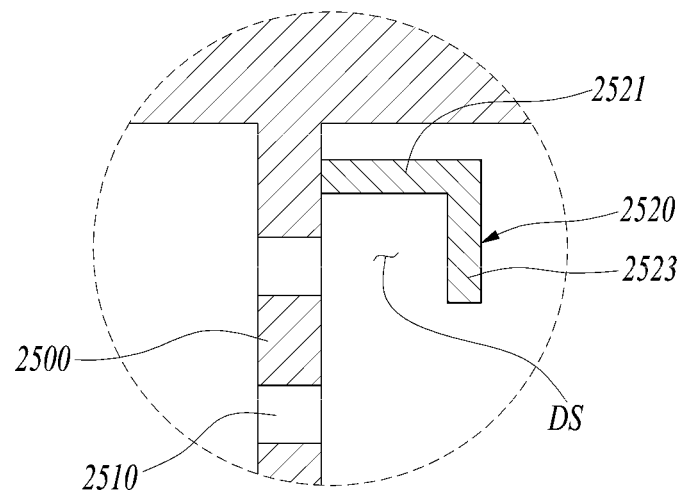
FIG. 6 is a sectional view illustrating a shock tube and a flow guide member in accordance with another exemplary embodiment.

FIG. 6 is a sectional view illustrating a shock tube and a flow guide member in accordance with another exemplary embodiment.

Referring to FIG. 6, the structure of the turbine blade in accordance with the exemplary embodiment except the flow guide member has the same structure as that of the turbine blade illustrated in FIG. 5, therefore, repetitive explanation thereof will be omitted.

A shock tube 2500 having a plurality of dispersion holes 2510 is installed at a position adjacent to the leading edge LE. A flow guide member 2520 is installed on an upper portion of the shock tube 2500. The flow guide member 2520 is bent such that a lower surface thereof is concave, whereby a pressure drop space DS is formed under the flow guide member 2520. The flow guide member 2520 includes a first plate 2521 fixed to the shock tube 2500, and a second plate 2523 bent from the first plate 2521. Here, the second plate 2523 may be bent inward toward the root member and perpendicularly bent from the first plate 2521.

Figure 7:
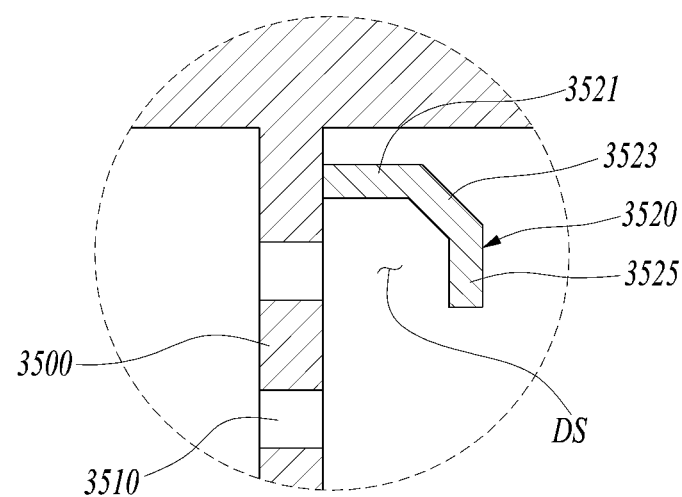
FIG. 7 is a sectional view illustrating a shock tube and a flow guide member in accordance with another exemplary embodiment.

FIG. 7 is a sectional view illustrating a shock tube and a flow guide member in accordance with another exemplary embodiment.

Referring to FIG. 7, the structure of the turbine blade in accordance with the exemplary embodiment except the flow guide member has the same structure as that of the turbine blade illustrated in FIG. 5, therefore, repetitive explanation thereof will be omitted.

A shock tube 3500 having a plurality of dispersion holes 3510 is installed at a position adjacent to the leading edge LE. A flow guide member 3520 is installed on an upper portion of the shock tube 3500. The flow guide member 3520 is bent such that a lower surface thereof is concave, whereby a pressure drop space DS is formed under the flow guide member 3520. The flow guide member 3520 includes a first plate 3521 fixed to the shock tube 3500, a second plate 3523 bent at an angle from the first plate 3521, and a third plate 3525 bent from the second plate 3523 toward the inner side at which the root member is disposed. Here, the second plate 3523 may be bent at an angle ranging from 30° to 60° with respect to the first plate 3521.

Figure 8:
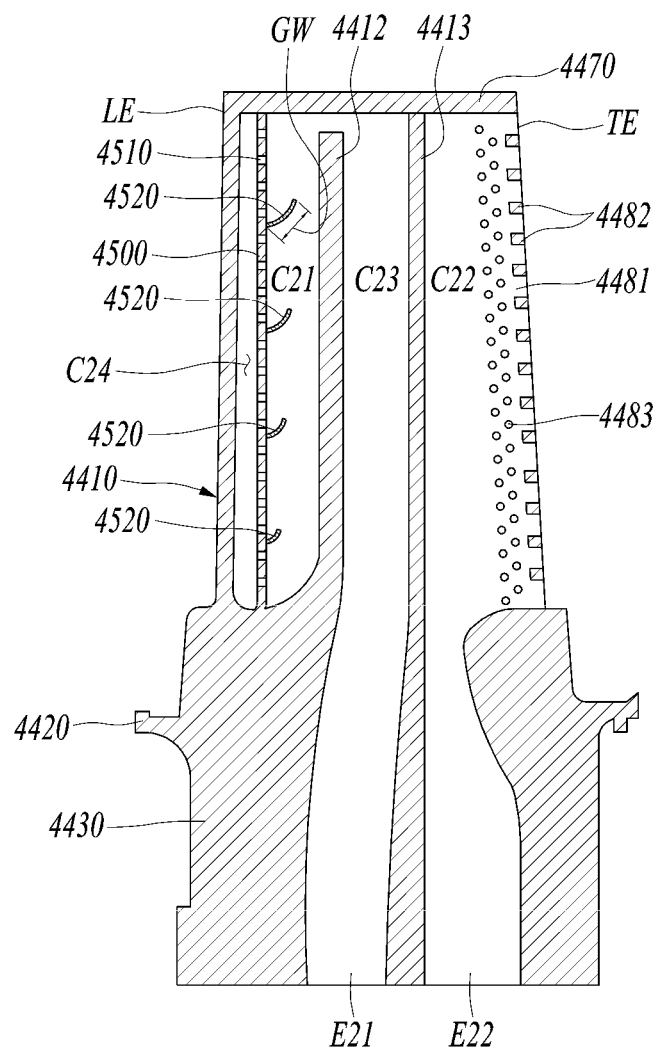
FIG. 8 is a longitudinal sectional view illustrating a turbine blade in accordance with another exemplary embodiment.

FIG. 8 is a longitudinal sectional view illustrating the turbine blade in accordance with another exemplary embodiment.

Referring to FIG. 8, the structure of the turbine blade in accordance with the exemplary embodiment except the flow guide member has the same structure as that of the turbine blade illustrated in FIG. 5, therefore, repetitive explanation thereof will be omitted.

The turbine blade 4400 may include an airfoil 4410 having a blade shape, a platform 4420 coupled to a lower portion of the airfoil 4410, and a root member 4430 which protrudes downwards from the platform 4420 and is coupled to the rotor disk. The platform 4420 may be disposed between the airfoil 4410 and the root member 4430 and have an approximately rectangular plate or rectangular pillar shape. A first inlet E21 and a second inlet E22 for supply of cooling air may be formed in a lower end of the root member 4430.

The airfoil 4410 may include a leading edge LE disposed at an upstream side based on a flow direction of combustion gas, and a trailing edge TE disposed at a downstream side.

Cooling holes communicating with the cooling passage of the airfoil 4410 may be formed to discharge cooling air.

The airfoil 4410 may include an outer wall 4470 which forms an outer appearance, and cooling passages C21, C22, C23, and C24, dividing plates 4412 and 4413, a shock tube 4500, and a flow guide member 4520 which are formed inside the outer wall 4470. The airfoil 4410 may include a first cooling passage C21 coupled with the leading edge LE, a second cooling passage C22 coupled with the trailing edge TE, a third cooling passage C23 formed between the first cooling passage C21 and the second cooling passage C22, and an auxiliary cooling passage C24 formed by a pressure tube in the first cooling passage C21. The airfoil 4410 may include a first dividing plate 4412 and a second dividing plate 4413 which extend in a height direction of the airfoil 4410 and divide an internal space of the airfoil 4410 into several portions.

The first cooling passage C21 is formed by the leading edge LE and the first dividing plate 4412 and connected with the second cooling passage C22. Air drawn into the first cooling passage C21 passes through the shock tube 4500 and is discharged through the cooling holes formed adjacent to the leading edge LE.

The second cooling passage C22 is formed by the trailing edge TE and the second dividing plate 4413. A plurality of cooling fins 4483 may be formed in the second cooling passage C22. The airfoil 4410 may further include a plurality of rear end cooling slots 4481 which are coupled with the second cooling passage C22 to discharge air from the second cooling passage C22 and spaced apart from each other in a height direction of the trailing edge TE, and a dividing protrusion 4482 which is formed between the rear end cooling slots 4481 to separate the rear end cooling slots 4481 from each other. The second cooling passage C22 is connected with the second inlet E22 and supplied with air. Air drawn into the second cooling passage C22 is discharged through the rear end cooling slots 4481.

The third cooling passage C23 is formed by the first dividing plate 4412 and the second dividing plate 4413. The third cooling passage C23 is connected with the first inlet E21 formed in a lower portion thereof so that air may be supplied to the third cooling passage C23. Some of air drawn into the third cooling passage C23 is discharged through the cooling holes, and the other air is supplied into the first cooling passage C21.

The first dividing plate 4412 is disposed to face the leading edge LE. The second dividing plate 4413 is disposed to face the trailing edge TE. An upper end of the first dividing plate 4412 is spaced apart from an upper end tip of the airfoil 4410. Therefore, air moves through space formed between the upper end of the first dividing plate 4412 and the tip of the airfoil 4410, so that air may move from the third cooling passage C23 into the first cooling passage C21. Air supplied through the first inlet E21 moves upward along the third cooling passage C23 and moves into the first cooling passage C21. In the third cooling passage C23, air moves from an inner side to an outer side. In the first cooling passage C21, air moves from the outer side to the inner side.

The shock tube 4500 is installed in the first cooling passage C21 to form the auxiliary cooling passage C24 between the shock tube 4500 and the leading edge LE. The shock tube 4500 having an arc-shaped curved cross-section is disposed at a position spaced apart from the leading edge LE by a predetermined distance. The shock tube 4500 extends in the height direction of the airfoil 4410. A plurality of dispersion holes 4510 are formed in the shock tube 4500. Air drawn from the third cooling passage C23 into the first cooling passage C21 passes through the shock tube 4500 and is discharged through the cooling holes formed in the leading edge LE. The shock tube 4500 functions to enhance the cooling efficiency by coming into contact with air.

A plurality of flow guide members 4520 are installed on the shock tube 4500. The flow guide members 4520 are disposed at positions spaced apart from each other in a height direction of the shock tube 4500. Each of the flow guide members 4520 may be formed of a curved plate such that a lower surface of which is convex downward.

The flow guide member 4520 disposed at the outer side and the flow guide member 4520 disposed at the inner side may have different widths GW. The flow guide member 4520 disposed at the inner side may have a width GW less than that of the flow guide member 4520 disposed at the outer side. According to this exemplary embodiment, the flow of air is guided by the plurality of flow guide members 4520 so that a uniform amount of air may be supplied to the leading edge LE through the shock tube 4500, whereby the cooling efficiency may be enhanced.

Figure 9:
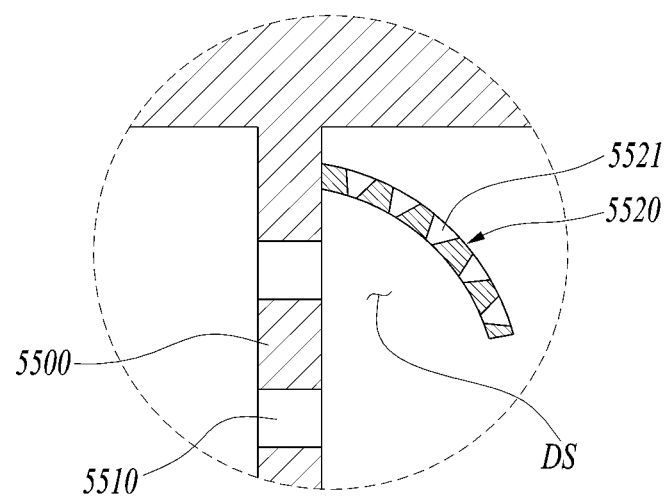
FIG. 9 is a sectional view illustrating a shock tube and a flow guide member in accordance with another exemplary embodiment.

FIG. 9 is a sectional view illustrating a shock tube and a flow guide member in accordance with another exemplary embodiment.

Referring to FIG. 9, the structure of the turbine blade in accordance with the exemplary embodiment except the flow guide member has the same structure as that of the turbine blade illustrated in FIG. 5, therefore, repetitive explanation thereof will be omitted.

A shock tube 5500 having a plurality of dispersion holes 5510 is installed at a position adjacent to the leading edge LE. A flow guide member 5520 is installed on an upper portion of the shock tube 5500. The flow guide member 5520 is curved such that a lower surface thereof is concave so that a pressure drop space DS is formed under the flow guide member 5520.

The flow guide member 5520 includes a plurality of pressure adjustment holes 5521. Each of the pressure adjustment holes 5521 is formed such that an inner diameter thereof is gradually reduced toward the shock tube 5500. Therefore, while air passes through the pressure adjustment holes 5521, the flow speed thereof is further increased. Then, air is injected into the pressure drop space DS so that a large amount of air may be induced in the pressure drop space DS.

Figure 10:
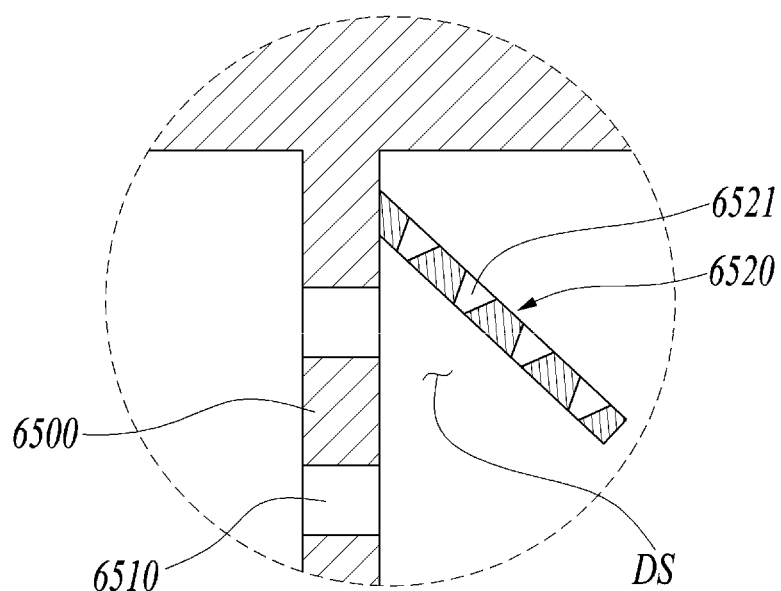
FIG. 10 is a sectional view illustrating a shock tube and a flow guide member in accordance with another exemplary embodiment.

FIG. 10 is a sectional view illustrating a shock tube and a flow guide member in accordance with another exemplary embodiment.

Referring to FIG. 10, a shock tube 6500 having a plurality of dispersion holes 6510 is installed at a position adjacent to the leading edge LE. A flow guide member 6520 is installed on an upper portion of the shock tube 6500. The flow guide member 6520 may be formed of a flat plate inclined with respect to a height direction of the shock tube 6500. An inclination angle formed between the flow guide member 6520 and the height direction of the shock tube 6500 may range from 30° to 60°.

The flow guide member 6520 includes a plurality of pressure adjustment holes 6521. Each of the pressure adjustment holes 6521 is formed such that an inner diameter thereof is gradually reduced toward the shock tube 6500. Therefore, while air passes through the pressure adjustment holes 6521, the flow speed thereof is further increased. Then, air is injected into the pressure drop space DS so that a large amount of air may be induced in the pressure drop space DS.

In an airfoil and a turbine in accordance with an exemplary embodiment, a shock tube and a flow guide member are installed so that the cooling efficiency of a leading edge portion may be enhanced.

While exemplary embodiments have been described with reference to the accompanying drawings, it will be apparent to those skilled in the art that various modifications in form and details. This disclosure may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. An airfoil including a leading edge and a trailing edge, the airfoil comprising:
   a first cooling passage connected to the leading edge;
   a second cooling passage connected to the trailing edge;
   a third cooling passage formed between the first cooling passage and the second cooling passage;
   a shock tube installed in the first cooling passage and configured to form an auxiliary cooling passage between the shock tube and the leading edge, and to include a plurality of dispersion holes in the shock tube; and
   a flow guide member installed on the shock tube and configured to guide a flow of air that is drawn from the third cooling passage into the first cooling passage,
   wherein the flow guide member comprises a plurality of pressure adjustment holes.

2. The airfoil according to claim 1,
   wherein an upper portion of the third cooling passage and an upper portion of the first cooling passage are connected to each other so that cooling air moves from the third cooling passage to the first cooling passage, and
   wherein the flow guide member is installed on an upper portion of the shock tube, and a pressure drop space is formed to a lower surface of the flow guide member.

3. The airfoil according to claim 2, wherein the flow guide member is curved in an arc shape.

4. The airfoil according to claim 2, wherein the flow guide member comprises a first plate fixed to the shock tube, and a second plate bent from the first plate.

5. The airfoil according to claim 2, wherein the flow guide member comprises a first plate fixed to the shock tube, a second plate bent at an angle from the first plate, and a third plate bent inward from the second plate.

6. The airfoil according to claim 2, wherein the flow guide member is formed such that a lower surface thereof is concave.

7. The airfoil according to claim 2, wherein the flow guide member comprises a flat plate inclined with respect to a height direction of the shock tube.

8. The airfoil according to claim 2, wherein each of the pressure adjustment holes is formed such that an inner diameter thereof is gradually reduced toward the shock tube.

9. The airfoil according to claim 2, wherein a plurality of flow guide members are disposed on the shock tube and spaced apart from each other in a height direction of the shock tube.

10. The airfoil according to claim 9, wherein each of the flow guide members is formed such that a lower surface thereof is convex.

11. The airfoil according to claim 10, wherein the flow guide member that is disposed at a radially inner side has a width from a fixed portion on the shock tube to opposite free end portion less than a width from a fixed portion on the shock tube to opposite free end portion of the flow guide member that is disposed at a radially outer side.

12. A turbine comprising:
    a rotor disk configured to be rotatable; and
    a plurality of turbine blades installed on the rotor disk,
    wherein each of the turbine blades comprises an airfoil having a blade shape and including a leading edge and a trailing edge, a platform coupled to a lower portion of the airfoil, and a root member protruding downward from the platform and coupled to the rotor disk, and
    wherein the airfoil comprises:
    a first cooling passage connected to the leading edge;
    a second cooling passage connected to the trailing edge;
    a third cooling passage formed between the first cooling passage and the second cooling passage;
    a shock tube installed in the first cooling passage and configured to form an auxiliary cooling passage between the shock tube and the leading edge, and to include a plurality of dispersion holes in the shock tube; and
    a flow guide member installed on the shock tube and configured to guide a flow of air that is drawn from the third cooling passage into the first cooling passage, and
    wherein the flow guide member comprises a plurality of pressure adjustment.

13. The turbine according to claim 12,
    wherein an upper portion of the third cooling passage and an upper portion of the first cooling passage are connected to each other so that cooling air moves from the third cooling passage to the first cooling passage,
    wherein the flow guide member is installed on an upper portion of the shock tube, and a pressure drop space is formed to a lower surface of the flow guide member.

14. The turbine according to claim 13,
    wherein each of the pressure adjustment holes is formed such that an inner diameter thereof is gradually reduced toward the shock tube.

15. The turbine according to claim 14, wherein the flow guide member is formed such that a lower surface thereof is concave.

16. The turbine according to claim 13, wherein the flow guide member is curved in an arc shape.

17. The turbine according to claim 13, wherein the flow guide member comprises a first plate fixed to the shock tube, and a second plate bent from the first plate.

18. The turbine according to claim 13, wherein the flow guide member comprises a first plate fixed to the shock tube, a second plate bent at an angle from the first plate, and a third plate bent inward from the second plate.

19. A gas turbine comprising:
    a compressor configured to compress air drawn thereinto from an outside;
    a combustor configured to mix fuel with air compressed by the compressor and combust a mixture of the fuel and the compressed air; and
    a turbine including a rotor disk configured to be rotatable and a plurality of turbine blades installed on the rotor disk to be rotated by combustion gas discharged from the combustor,
    wherein each of the turbine blades comprises an airfoil having a blade shape and including a leading edge and a trailing edge, a platform coupled to a lower portion of the airfoil, and a root member protruding downward from the platform and coupled to the rotor disk, and
    wherein the airfoil comprises:
    a first cooling passage connected to the leading edge;
    a second cooling passage connected to the trailing edge;
    a third cooling passage formed between the first cooling passage and the second cooling passage;

a shock tube installed in the first cooling passage and configured to form an auxiliary cooling passage between the shock tube and the leading edge, and to include a plurality of dispersion holes in the shock tube; and a flow guide member installed on the shock tube and configured to guide a flow of air that is drawn from the third cooling passage into the first cooling passage, and wherein the flow guide member comprises a plurality of pressure adjustment holes.

* * * * *